(12) United States Patent
Kovaluk et al.

(10) Patent No.: US 9,958,685 B2
(45) Date of Patent: May 1, 2018

(54) DUAL-AXIS TILT PLATFORM FOR HEAD MOUNTED DISPLAY

(71) Applicant: THE BOEING COMPANY, Chicago, IL (US)

(72) Inventors: Randall L. Kovaluk, Chicago, IL (US); Eric L. Hauquitz, Chicago, IL (US); Gregory Knipping, Chicago, IL (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 15/134,275

(22) Filed: Apr. 20, 2016

(65) Prior Publication Data

US 2017/0307896 A1 Oct. 26, 2017

(51) Int. Cl.
| | |
|---|---|
| *G02B 27/01* | (2006.01) |
| *G02B 27/14* | (2006.01) |
| *G09G 5/00* | (2006.01) |
| *G02B 27/00* | (2006.01) |
| *G06F 1/16* | (2006.01) |
| *G06T 19/00* | (2011.01) |

(52) U.S. Cl.
CPC ..... *G02B 27/0176* (2013.01); *G02B 27/0093* (2013.01); *G06F 1/166* (2013.01); *G06F 1/1639* (2013.01); *G06F 1/1649* (2013.01); *G06F 1/1681* (2013.01); *G06T 19/006* (2013.01); *G02B 2027/015* (2013.01); *G02B 2027/0152* (2013.01); *G02B 2027/0159* (2013.01); *G02B 2027/0161* (2013.01)

(58) Field of Classification Search
CPC .... G02B 27/01; G02B 27/0176; G02B 27/14; G02B 2027/0154; G02B 2027/0178; G02B 27/0093; G02B 2027/015; G02B 2027/0152; G02B 2027/0158; G02B 2027/0161; G06F 1/1639; G06F 1/1649; G06F 1/166; G06F 1/1681; G06T 19/006
USPC .................. 359/629–632; 345/7–9
See application file for complete search history.

(56) References Cited

U.S. PATENT DOCUMENTS

| | | | | |
|---|---|---|---|---|
| 5,703,683 | A * | 12/1997 | Hunt .................... | G01J 3/44 248/466 |
| 8,753,399 | B2 * | 6/2014 | Sharifi-Mehr ........ | A61F 2/4425 623/17.13 |

* cited by examiner

*Primary Examiner* — Loha Ben
(74) *Attorney, Agent, or Firm* — Haynes and Boone, LLP

(57) ABSTRACT

A tilt platform for use in an HMD comprises a monolithic spring structure including a first outer planar structure, a second outer planar structure, a middle planar structure disposed between the first and second outer planar structures, a first hinge structure coupling the first outer planar structure and the middle planar structure to each other, and a second hinge structure coupling the second outer planar structure and the middle planar structure to each other. The first and second hinge structures have respective first and second hinge axes that are orthogonal to each other. The tilt platform further comprises a first adjustment mechanism configured for tilting the first outer planar structure and the middle planar structure relative to each other about the first hinge axis, and a second adjustment mechanism configured for tilting the second outer planar structure and the middle planar structure relative to each other about the second hinge axis.

22 Claims, 12 Drawing Sheets

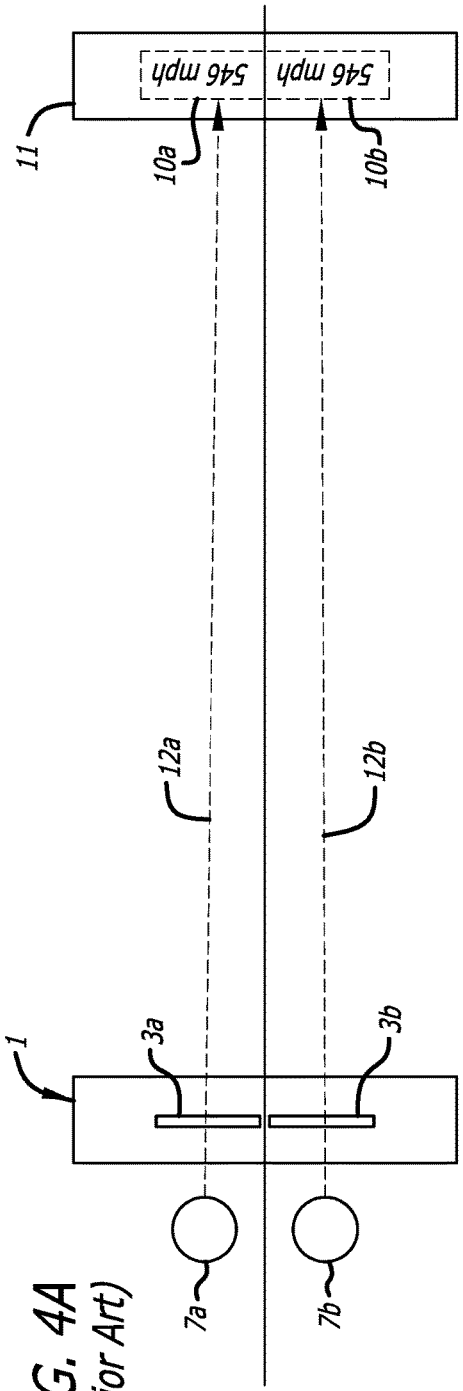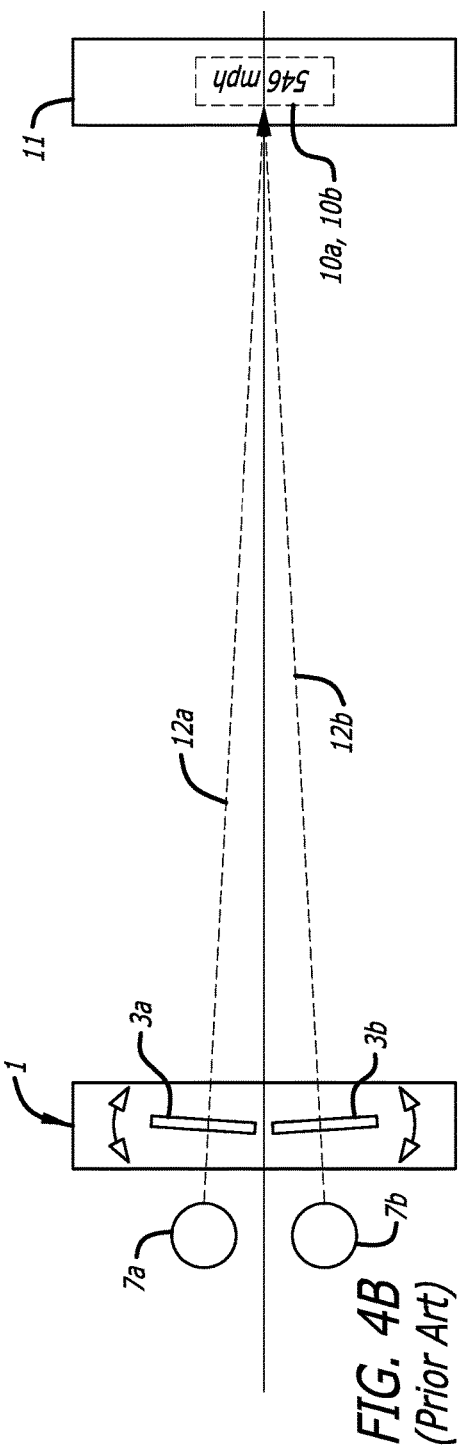

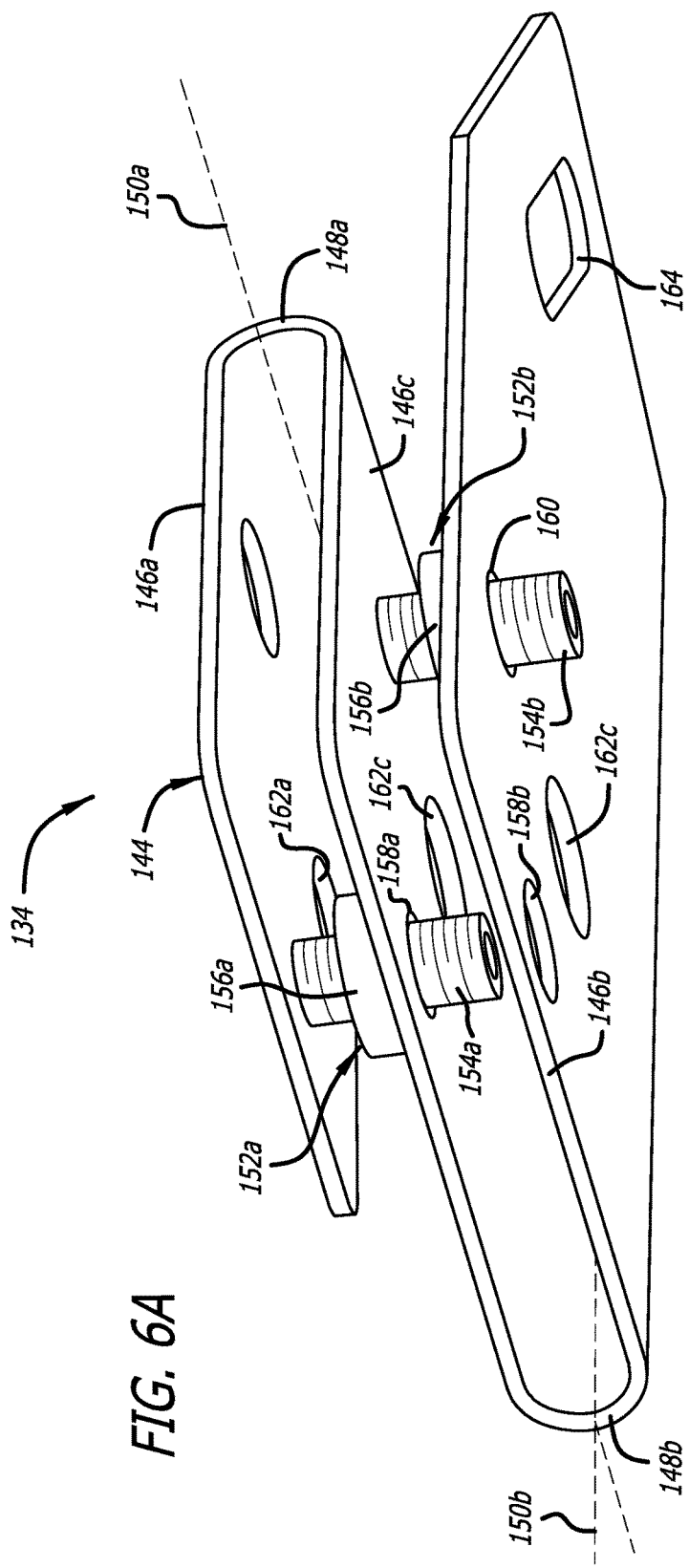

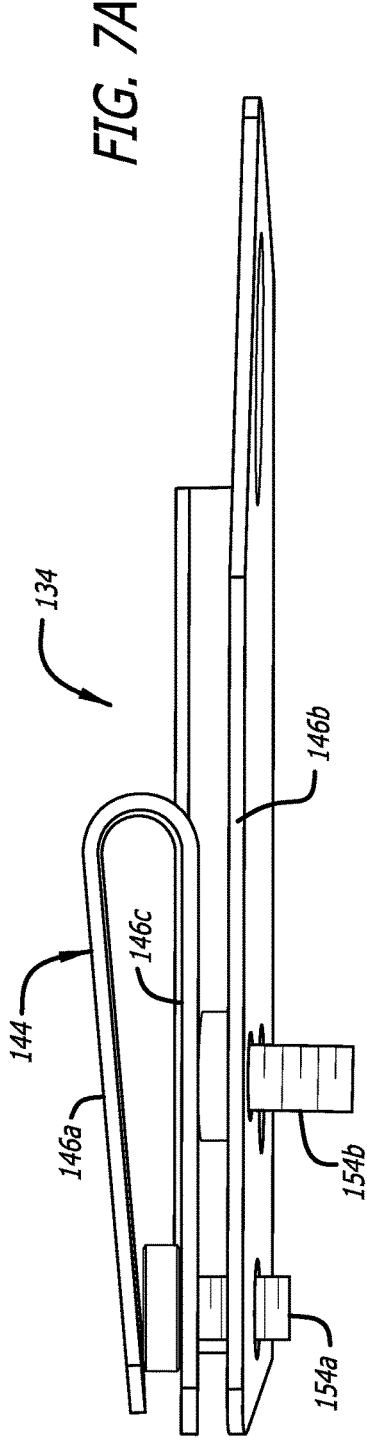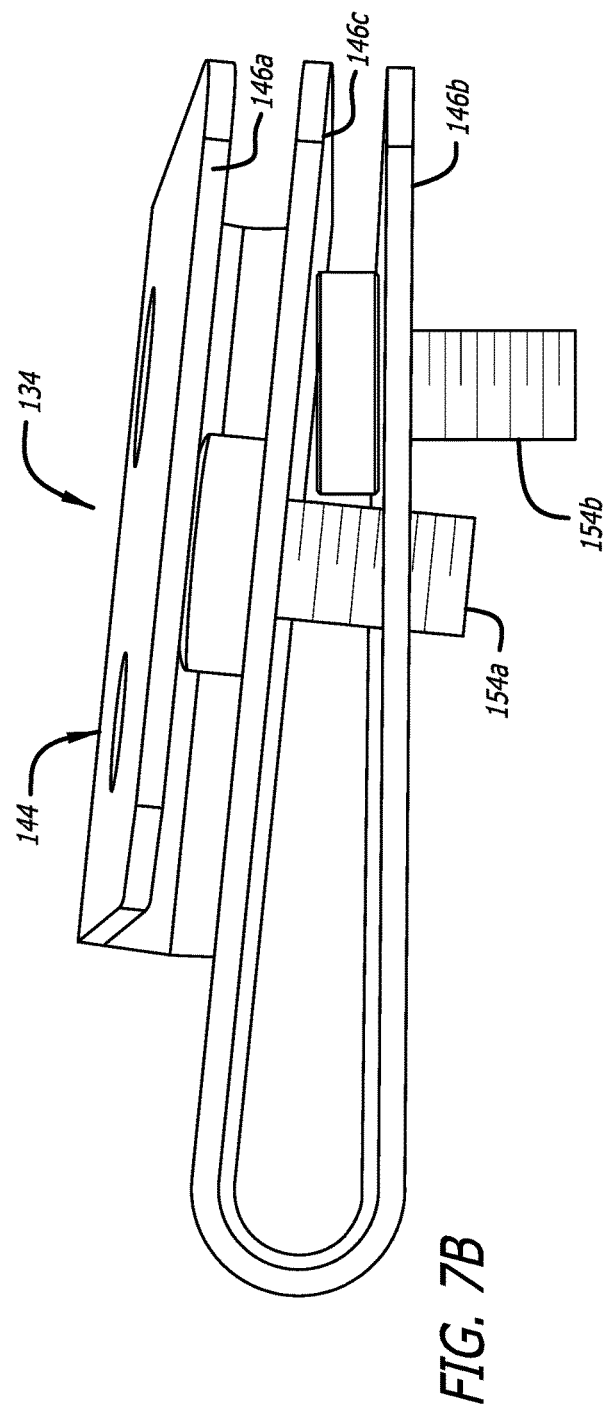

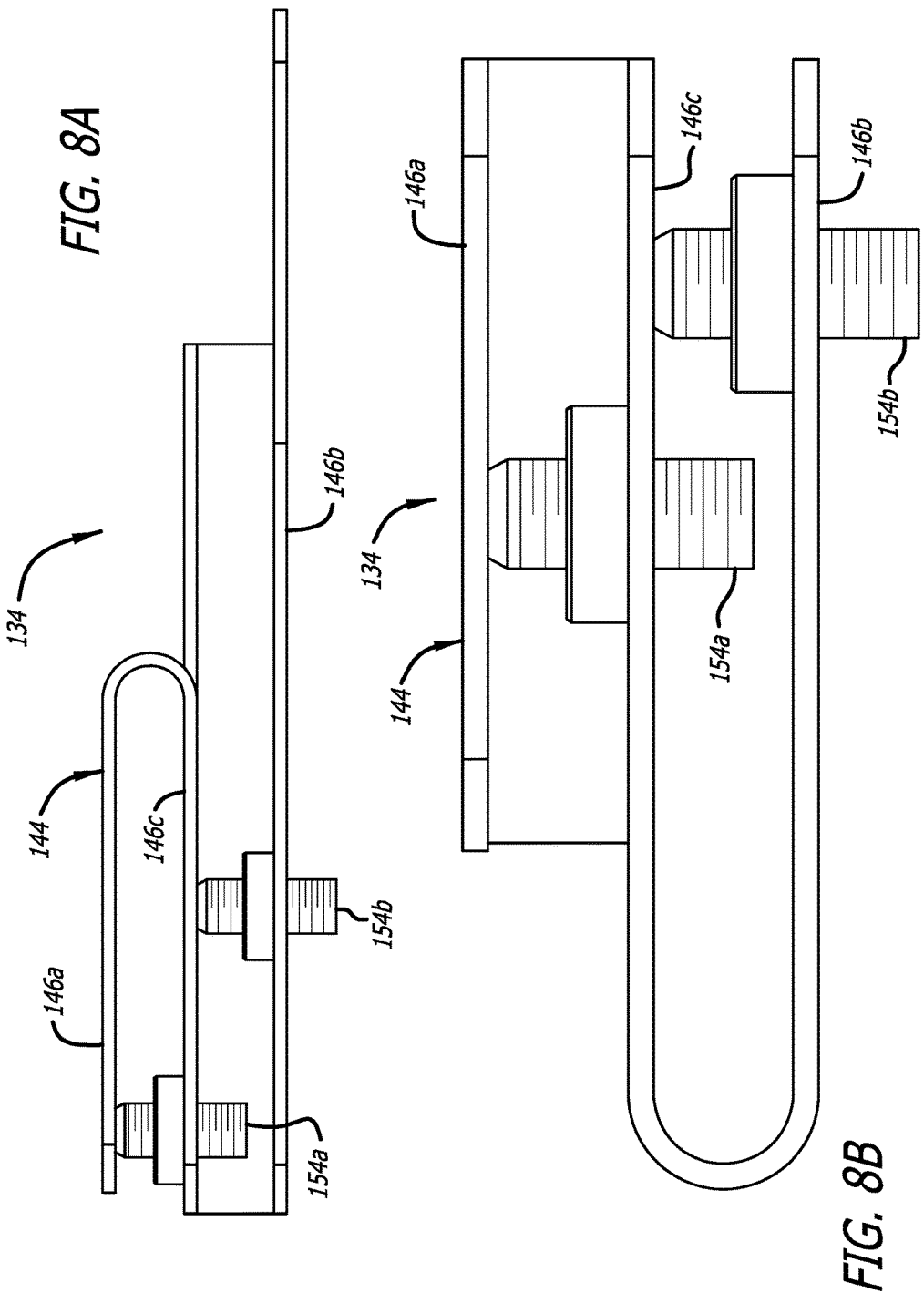

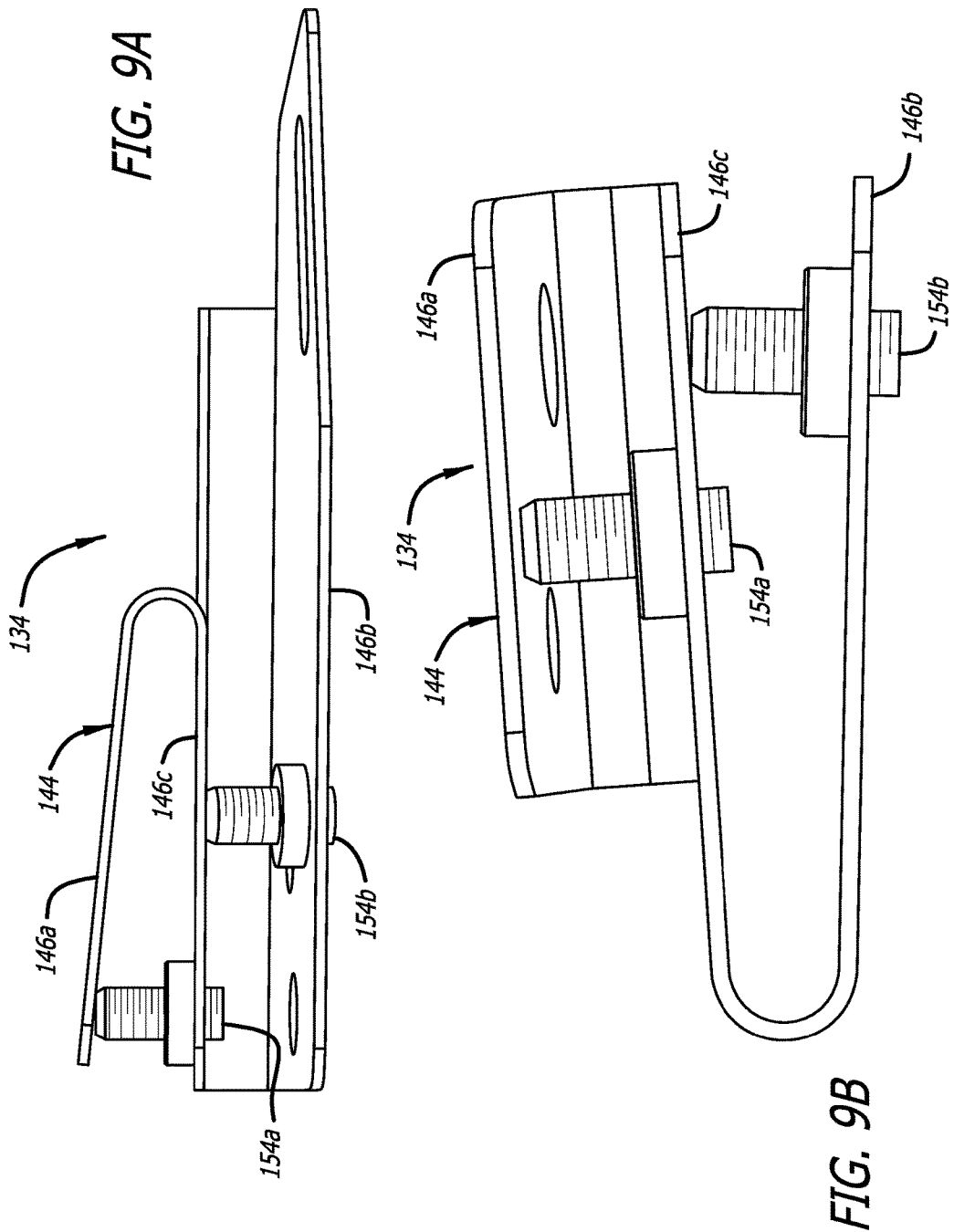

DUAL-AXIS TILT PLATFORM FOR HEAD MOUNTED DISPLAY

FIELD

The present disclosure generally relates to head mounted displays (HMDs), and in particular, display mounting devices for HMDs.

BACKGROUND

Military aircraft are frequently equipped with head-mounted displays (HMDs) through which an operator of the aircraft, such as the pilot or navigator, may visualize real-world objects in the environment. The HMDs display virtual objects, such as tactical information, such that the operator may visualize the virtual objects superimposed over the view of the real-world objects. Newer HMDs are binocular in nature; that is, having two separate eye displays that are disposed over each eye of the operator.

Referring to FIG. 1, one prior art embodiment of an HMD 1 comprises a helmet 2, two separate left and right eye display screens 3a, 3b, two separate left and right image projection devices 4a, 4b, and a head tracking device 5. The display screens 3a, 3b, image projection devices 4a, 4b, and head tracking device 6 are typically mounted to the helmet 2. The display screens 3a, 3b take the form of semi-reflective mirrors through which the respective left and right eyes of the operator may see, and on which a two-dimensional image is projected via the respective image projection devices 4a, 4b, typically tactical information. The head tracking device 6 detects the position/orientation of the helmet 2, and thus the operator's head on which the helmet 2 is worn, and transmits this positional information to an HMD image generator 6 that is separate and remote from the helmet 2. The HMD image generator 6 generates a two-dimensional image that is transmitted to the image projection devices 4a, 4b for respective display of left and right images via the left and right display screens 3a, 3b.

The HMD may either be used in the context of a real-world environment or a simulated virtual environment. For example, referring to FIG. 2, the HMD 1 may be used in a real-world environment, where the left and right eyes 7a, 7b of the operator can respectively see through the display screens 3a, 3b to the real world 8 outside of the canopy or windshield 9, such that the two-dimensional images 10a, 10b (in this case, "546 mph") projected onto the display screens 3a, 3b, are seen by the operator as being superimposed over the real world environment 8. As another example, referring to FIG. 3, the HMD 1 may be used in a virtual environment inside of a simulator, where the left and right eyes 7a, 7b of the operator can respectively see through the display screens 3a, 3b to a screen 11 on which simulated images 12 generated by a computerized image generator (not shown) are displayed, such that the two-dimensional images 10a, 10b (in this case, "546 mph") projected onto the display screens 3a, 3b are seen by the operator as being superimposed over the simulated images 12 on the screen 11. It is noted that the images 10a, 10b generated by the HMD 1 are virtual in nature in that they are not actually located on the respective display screens 3a, 3b, but rather appear distant (out in front of) the display screens 3a, 3b.

Whether the HMD system 1 is located in a real-world environment or a simulated environment, it is important that the images being produced by the HMD are harmonized such that both eyes see the proper content for the type of display being configured (monocular, biocular, or binocular), and that the proper vergence condition is supported for the image distance. The two-dimensional images projected onto the display screens 3a, 3b are very similar and complementary to each other, or may even be identical depending on the type of HMD being supported. The images are in identical locations on the respective display screens 3a, 3b. The human brain will naturally process these identical images and see them as a single image. For this reason, it is important that the display screens 3a, 3b project their respective images into the same focal plane and more specifically into the same location in that plane. For example, as shown in FIGS. 4a and 4b, adjustment of the angles of the display screens 3a, 3b changes the angles of the optical axes 12a, 12b, thereby translating respective locations of the images 10a, 10b that are centered at the ends of the optical axes 12a, 12b. As shown in FIG. 4a, the images 10a, 10b are not converged together prior to adjustment of the display screens 3a, 3b, whereas the images 10a, 10b are converged to a fused image subsequent to adjustment of the display screens 3a, 3b. Even though the individual images 10a, 10b in the focal plane are not precisely coplanar in FIG. 4b, since each is orthogonal to the respective optical axis 12a or 12b, this deviation is well within the eye-brain's ability to fuse them together comfortably. The focal distances of the images 10a, 10b, which are virtual, have been designed or corrected by the HMD 1 to equal the viewing distance to the screen 11.

To this end, during fabrication of the HMD system 1 by a supplier, each of the display screens 3a, 3b will typically be mounted to the helmet 2 via a tilting mechanism (not shown), finely adjustable in two orthogonal axes via adjustment mechanisms, such as screws. Prior to shipping the HMD system 1 to a customer, the supplier may adjust the angle of the tilt platform via the screws to align the display screens 3a, 3b along a single focal plane.

Although this display mounting and adjustment process works well in theory, currently available tilt platforms employ multiple parts of considerable size and weight in support of the task of fine angular adjustment for the delicate display components. For example, current tilt platforms employ a set of two mounting plates separated by a ball or pedestal as a pivot point, which are held in close relationship with each using a captive spring arrangement of some kind for each axis of adjustment. Typically, these plates are fairly massy to contribute rigidity to the structure. The resulting size of the apparatus is too large to use in a small space, such as the available space in an HMD. Thus, for use in a HMD, the weight and size of the tilt platform may be excessive, thereby reducing the efficiency of the HMD. The use of multiple parts also increases the manufacturing cost of the tilt platform, and thus, the overall cost of the HMD.

There, thus, remains a need for a more compact, more lightweight, and less expensive dual-axis tilt platform for use in mounting a display in an HMD.

SUMMARY

In accordance with a first aspect of the present inventions, a dual-axis tilt platform for use in a head mounted display (HMD) comprises a monolithic spring structure, which can be composed of a suitable material, such as, e.g., spring steel. The spring structure includes a first outer planar structure, a second outer planar structure, a middle planar structure disposed between the first and second outer planar structures, a first hinge structure coupling the first outer planar structure and the middle planar structure to each other, and a second hinge structure coupling the second outer planar structure and the middle planar structure to each other. The first and second hinge structures have respective first and second hinge axes that are orthogonal to each other.

The dual-axis tilt platform further comprises a first adjustment mechanism configured for tilting the first outer planar structure and the middle planar structure relative to each other about the first hinge axis. The dual-axis tilt platform further comprises a second adjustment mechanism configured for tilting the second outer planar structure and the middle planar structure relative to each other about the second hinge axis. In one embodiment, the first adjustment mechanism includes a first set screw configured for being rotated to tilt the first outer planar structure and the middle planar structure relative to each other about the first hinge axis, and the second adjustment mechanism includes a second set screw configured for being rotated to tilt the second outer planar structure and the middle planar structure relative to each other about the second hinge axis. The first adjustment mechanism may further include a first clinch nut in which the first set screw is threadingly engaged, the first clinch nut being affixed to one of the first outer planar structure and the middle planar structure, and the second adjustment mechanism may further include a second clinch nut in which the second set screw is threadingly engaged, the second clinch nut being affixed to one of the second outer planar structure and the middle planar structure.

In one embodiment, the first adjustment mechanism is configured for selectively tilting the first outer planar structure and the middle planar structure relative to each other in a first angular range (e.g., −5 degrees to +5 degrees) and the second adjustment mechanism is configured for selectively tilting the second outer planar structure and the middle planar structure relative to each other in a second angular range (e.g., −5 degrees to +5 degrees). Each of the first and second angular ranges may be at a minimum when the monolithic spring structure is in a relaxed state.

In accordance with a second aspect of the present inventions, a head mounted display (HMD) comprises head gear (e.g., a helmet) configured for being worn on the head of a user, and at least one dual-axis tilt platform mounted to the head gear. Each of the dual-axis tilt platform(s) comprises a monolithic spring structure including a first outer planar structure, a second outer planar structure, a middle planar structure disposed between the first and second outer planar structures, a first hinge structure having a first hinge axis about which the first outer planar structure and the middle planar structure can be selectively tilted relative to each other, and a second hinge structure having a second hinge axis about which the second outer planar structure and the middle planar structure can be selectively tilted relative to each other. The first and second hinge axes are orthogonal to each other.

The HMD further comprises at least one display module respectively mounted to the dual-axis tilt platform(s), such that an orientation of each of the display module(s) is adjustable in two orthogonal planes. In the case where there are two dual-axis tilt platforms two display modules are respectively mounted to the two dual-axis tilt platforms. Each of the display module(s) includes a display screen (e.g., a semi-reflective display screen) and an image projection device mechanically coupled to each other. The respective display screen is locatable in front of a respective eye of the user, and the image projection device is configured for projecting an image via the respective display screen. In an optional embodiment, the HMD further comprises a head tracking detector mounted to the head gear. The tracking detector is configured for tracking a position and/or direction of the head of the user.

In accordance with a third aspect of the present inventions, a method of using the HMD comprises adjusting the orientation of each of the display module(s) in one of the two orthogonal planes by selectively tilting the first outer planar structure and the middle planar structure relative to each other about the first hinge axis of the first hinge structure, and adjusting the orientation of each of the display module(s) in another of the two orthogonal planes by selectively tilting the second outer planar structure and the middle planar structure relative to each other about the second hinge axis of the second hinge structure. If two display modules are provided, the method may comprise adjusting the orientation of each of the two display modules in one of the two orthogonal planes comprises selectively tilting the first outer planar structure and the middle planar structure relative to each other about the first hinge axis of the first hinge structure for each of the display modules until optical axes of the display modules converge in one dimension of a focal plane, and adjusting the orientation of each of the two display modules in another of the two orthogonal planes comprises selectively tilting the second outer planar structure and the middle planar structure relative to each other about the second hinge axis of the second hinge structure for each of the display modules until the optical axes of the display modules converge in another dimension of the focal plane.

In accordance with a third aspect of the present inventions, a method of manufacturing a dual-axis tilt platform for use in a head mounted display (HMD), comprises providing a sheet of resilient material (e.g., a sheet of spring steel), plastically deforming the sheet of resilient material about a first axis to form two planar structures and a first hinge structure disposed between the two planar structures, and plastically deforming one of the two planar structures about a second axis orthogonal to the first axis to form another planar structure and a second hinge structure between the one of the two planar structures and the other planar structure.

The method further comprises affixing a first tilt angle adjustment mechanism between the two planar structures, and affixing a second tilt angle adjustment mechanism between the one of the two planar structures and the other planar structure. Affixing the first tilt angle adjustment mechanism between the two planar structures may, e.g., comprise press fitting a first clinch nut to the portion of the sheet of resilient material that will form or that forms one of the two planar structures, and threading a first set screw through the first clinch nut to dispose the first set screw between the two planar structures. Affixing the second tilt angle adjustment mechanism between the one of the two planar structures and the other planar structures may, e.g., comprise press fitting a second clinch nut to the portion of the sheet of resilient material that will form or that forms one of another of the two planar structures and the other planar structure, and threading a second set screw through the second clinch nut to dispose the second set screw between the one of the two planar structures and the other planar structure.

In accordance with a fourth aspect of the present inventions, a method of manufacturing a head mounted display (HMD) comprises manufacturing the dual-axis tilt platform(s), mounting the dual-axis tilt platform(s) to head gear (e.g., a helmet), and mounting at least one display module respectively to the dual-axis tilt platform(s). If two dual-axis tilt platforms are mounted to the head gear, two dual-axis display modules will be respectively mounted to the dual-axis tilt platforms. Optionally, the method may further comprise mounting a head tracking detector to the head gear.

Other and further aspects and features of the invention will be evident from reading the following detailed description of the preferred embodiments, which are intended to illustrate, not limit, the invention.

DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 4a and 4b are block diagrams of the prior art HMD in use in a virtual world environment, particularly showing adjustment of the display screens to effect a proper vergence of left and right virtual images;

FIGS. 6a and 6b are perspective views of a dual-axis tilt platform used for mounting a display module to head gear in the HMD of FIG. 5;

FIGS. 7a and 7b are orthogonal side views of the dual-axis tilt platform in a fully closed state;

FIGS. 8a and 8b are orthogonal side views of the dual-axis tilt platform in a half-way open state;

FIGS. 9a and 9b are orthogonal side views of the dual-axis tilt platform in a fully open state;

DESCRIPTION

Figure 1:
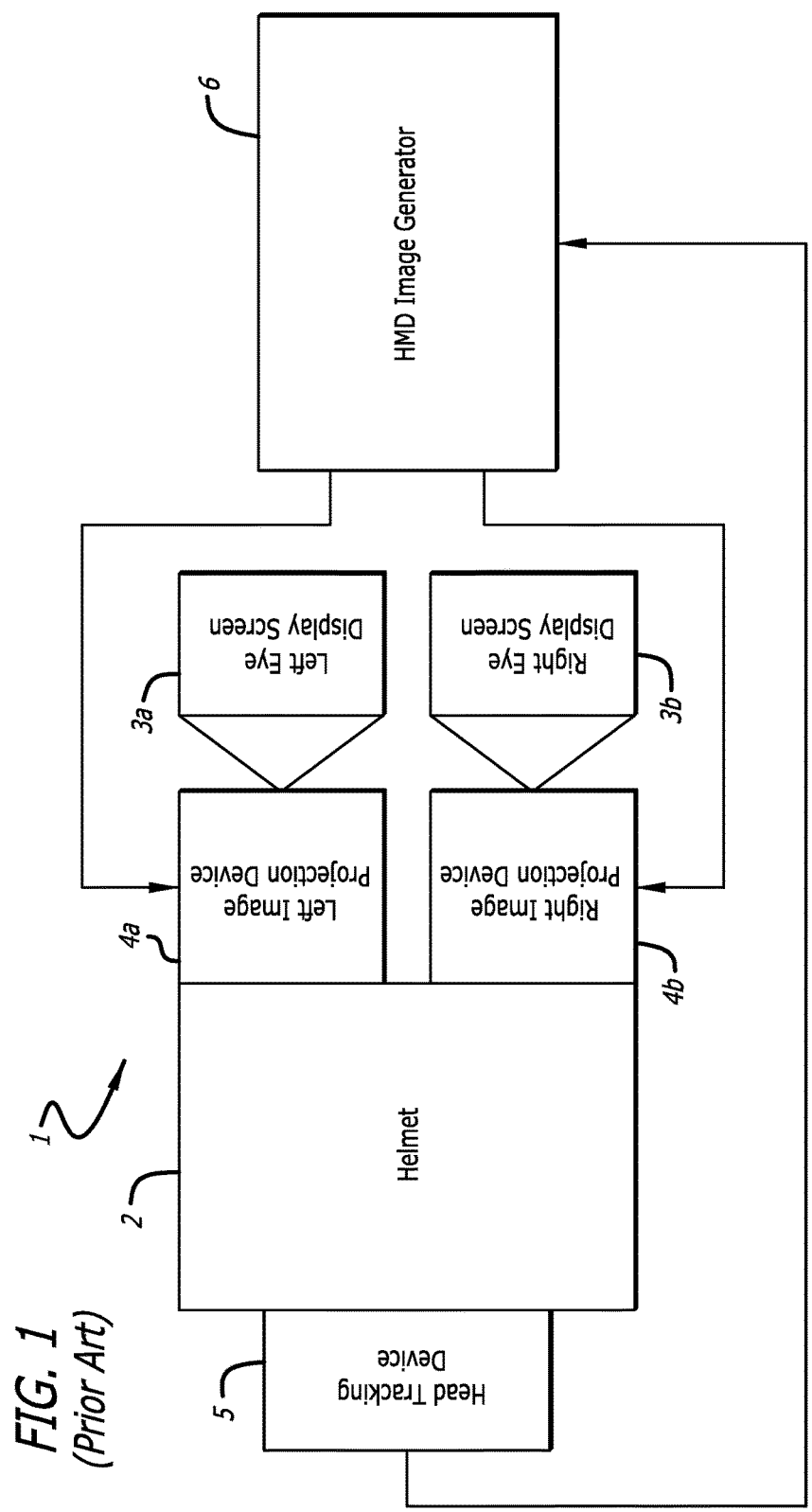
FIG. 1 is a block diagram of a prior art head mounted display (HMD)
Figure 2:
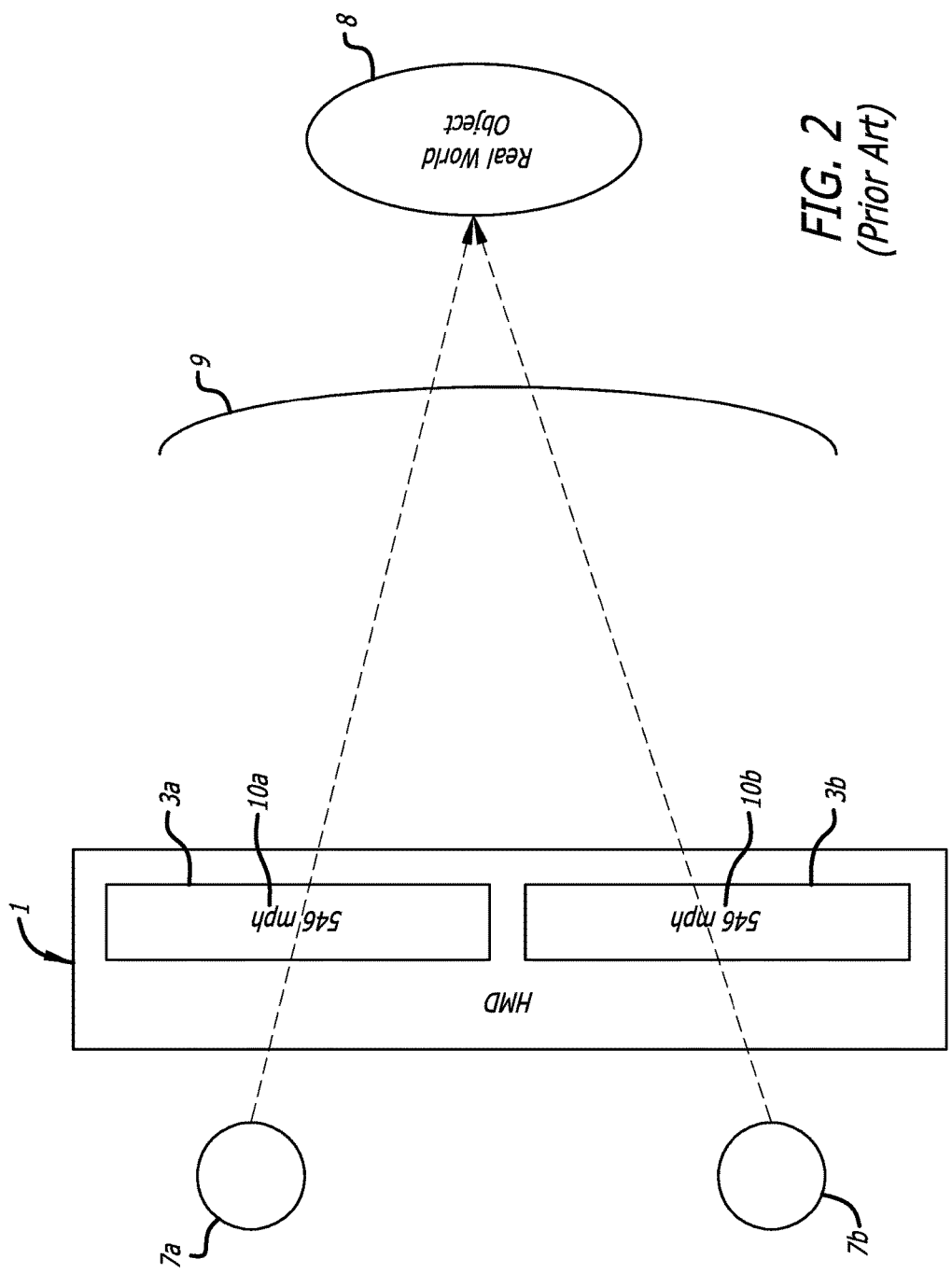
FIG. 2 is a block diagram of the prior art HMD in use in a real-world environment.
Figure 3:
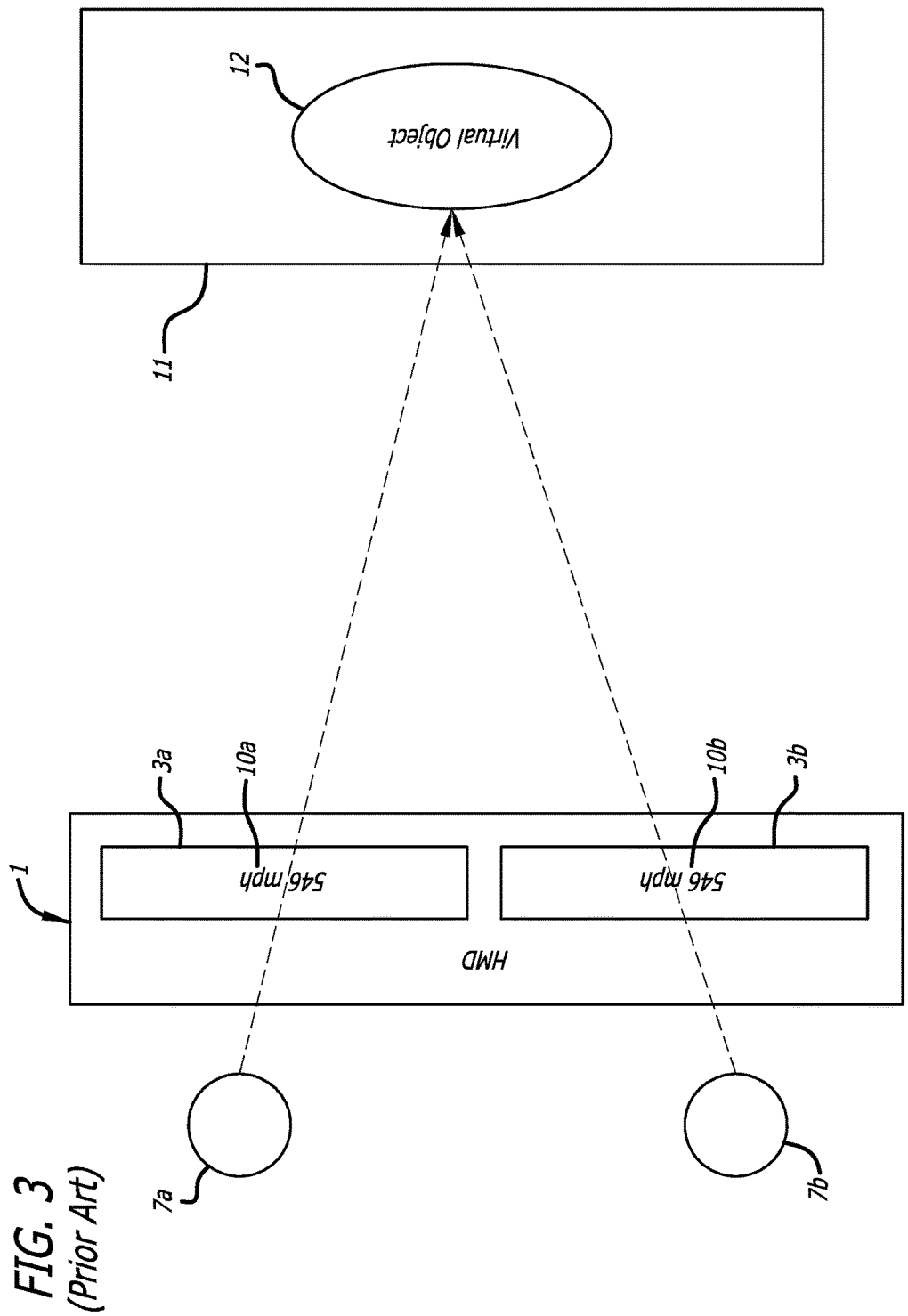
FIG. 3 is a block diagram of the prior art HMD in use in a virtual world environment.
Figure 5:
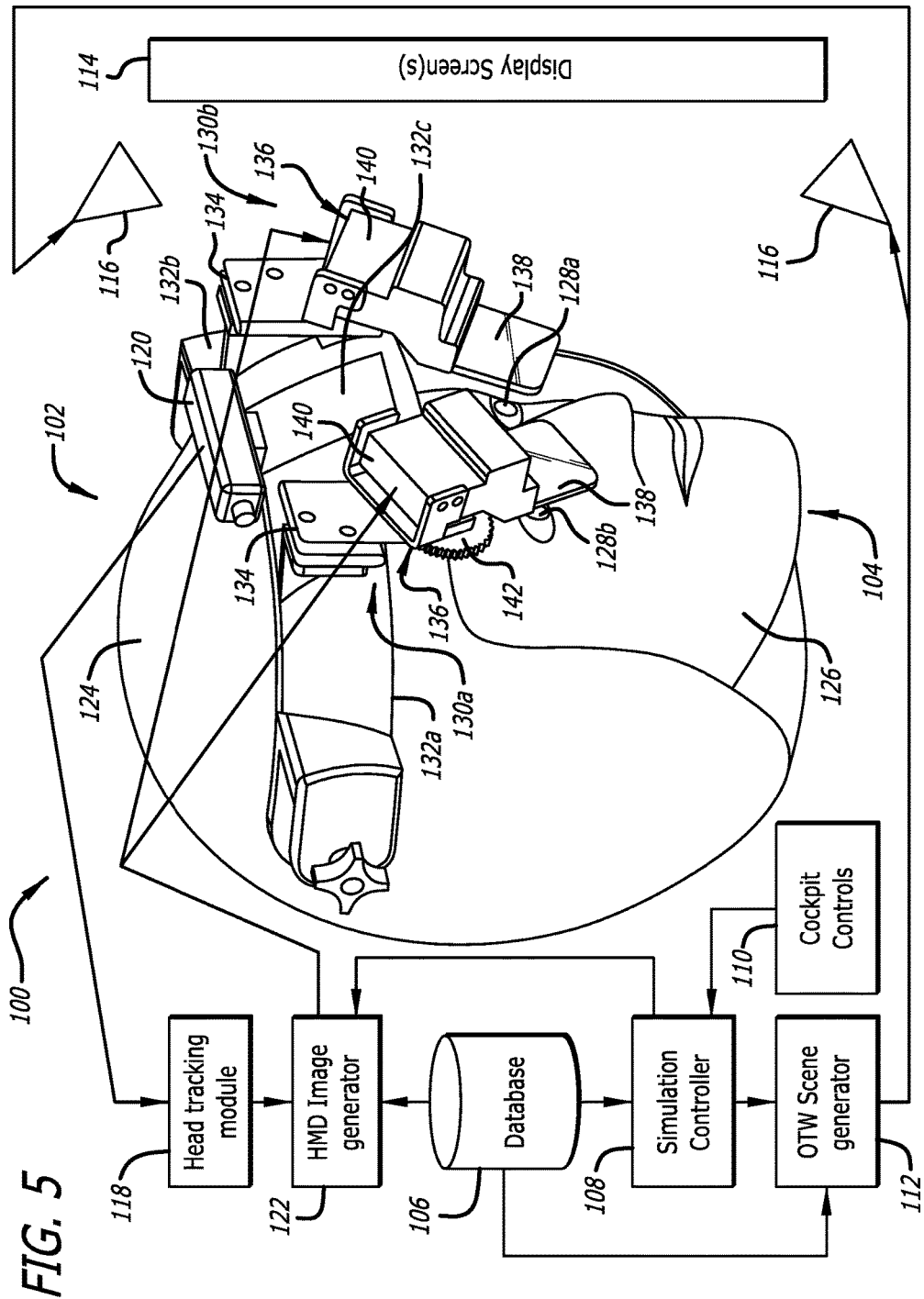
FIG. 5 is a plan view of an HMD constructed in accordance with one embodiment of the present inventions, wherein the HMD is in use in the context of a flight simulation system.

Referring to FIG. 5, a head mounted display (HMD) 102 constructed in accordance with one embodiment of the present inventions will now be described. The HMD 102 is described herein within the context of a flight simulation system 100, which is a computerized real-time system that interacts with a user, and in this case a trainee pilot 104, by outputting simulated scenes in response to cockpit control inputs. It should be appreciated, however, that the HMD 102 may be used in an actual aircraft (military or commercial) or spacecraft. The HMD 102 may also be used in virtual and augmented reality systems, such as those used for video games.

In addition to the HMD 102, the flight simulation system 100 comprises a database 106 storing three-dimensional scene data that defines the virtual environment in which the trainee pilot is immersed, e.g., the terrain and other aircraft, as well as the aircraft in which the trainee pilot is virtually flying. The flight simulation system 100 further comprises simulation controller 108 that modifies the scene data from the database 106 in response to cockpit outputs 110 to conform the scene data to continually changing locations and content of the virtual environment. The flight simulation system 100 further comprises an out-the-window (OTW) scene generator 112, which under control of the simulation controller 108, renders the scene data from the database 106 into imagery representing the environment outside of the aircraft. The flight simulation system 100 further comprises at least one OTW display screen 114 (in the illustrated embodiment, one) visible by the pilot trainee, and at least one image projector 116 (in the illustrated embodiment, two) configured for projecting the imagery generated by the OTW scene generator 112 as a series of synchronized image frames of a video onto the display screen(s) 114.

The flight simulation system 100 further comprises a head tracking module 118, which along with a head tracking detector 120, continually identifies the position and direction of the head 126 of the trainee pilot 104. The flight simulation system 100 further comprises an HMD image generator 122 that generates display imagery that is viewed by the trainee pilot 104 via the HMD 102. In the illustrated embodiment, the HMD 102 is biocular in nature, and thus, the imagery generated by the HMD image generator 122 takes the form of two identical videos that are displayed to the respective left eye 128a and right eye 128b of the trainee pilot 104. Each video comprises a series of synchronized image frames, with each frame containing symbology or imagery that corresponds to the location and content of the virtual objects in the video generated by the OTW scene generator 112, which is determined for a point of view derived from the signals received from the head tracking module 118. The videos are transmitted from the HMD image generator 122 to the HMD 102 as image data. As will be described in further detail below, this image data is transformed by the HMD 102 into an images viewable by the trainee pilot 104. The flight simulation system 100 further comprises head gear 124 configured for being worn on the head 126 of the trainee pilot 104. In the illustrated embodiment, the head gear 124 takes the form of a helmet, such as the type worn by operators of military aircraft.

The foregoing components of the flight simulation system 100 are conventional in nature, and will thus, not be describe in further detail herein.

More significant to the present inventions, the HMD 102, itself, comprises a left imaging assembly 130a and a right imaging assembly 130b configured for presenting the identical videos (e.g., tactical data) to the respective left eye 128a and right eye 128b of the trainee pilot 104. The helmet 124 comprises left and right helmet mounts 132a, 132b respectively configured for mounting the left and right imaging assemblies 130a, 130b to the structure of the helmet 124, as well as a middle helmet mount 132c configured for mounting the head tracking detector 120 to the helmet 124 in a conventional manner.

Each of the left and right imaging assemblies 130a, 130b comprises a dual-axis tilt platform 134 affixed to the respective helmet mount 132 of the helmet 124, and a display module 136 mounted to the dual-axis tilt platform 134, such that an orientation of the display module 136 is adjustable in two orthogonal planes. Each display module 136 comprises a display screen 138 and an image projection device 140 mechanically coupled to each other, such that the respective display screen 138 is locatable in front of a respective eye 128 of the trainee pilot 104, and the image projection device 140 is configured for projecting the virtual image of the respective video onto the OTW screen 114 via the respective display screen 138. In the illustrated embodiment, each display screen 138 takes the form of a semi-reflective mirror, such that the HMD image frames projected onto the display screens 138 are seen by the trainee pilot 104 as being superimposed over the simulated image frames on the OTW display screen(s) 114. Each of the image projection devices 140 may, e.g., take the form of a cathode ray tube (CRT), liquid crystal display (LCD), liquid crystal on silicon (LCos), organic light emitting diode (OLED) display, or light guide optical element (LOE) technology. Each of the display modules 136 may be rotated and fixed about a respective axis via a thumb wheel 142, so that the display screen 138 may be selectively moved to the proper location directly in front of the respective eye 128 of the trainee pilot 104. It should be appreciated that the entirety of the imaging assemblies 130 may be raised up via the helmet mounts 132 and locked into a stowage position, and therefore, the thumb wheels 142 only finely adjust for the proper location of the display screens 138 in front of the eyes. It should also be appreciated that the virtual images may be electronically de-rotated, such that, after the display modules 136 have been fixed in place via the thumb wheels 142, the virtual images will appear properly oriented.

As will be described in further detail below, the dual-axis tilt platforms 134 can be manipulated, such that the planes of the individual display screens 138 can be aligned in two dimensions to achieve an optical vergence condition for the set of display modules 136, such that the trainee pilot perceives a combined, focused HMD image that appears to be in the same plane as the scene image being projected onto the OTW screen 114.

Figure 6B:
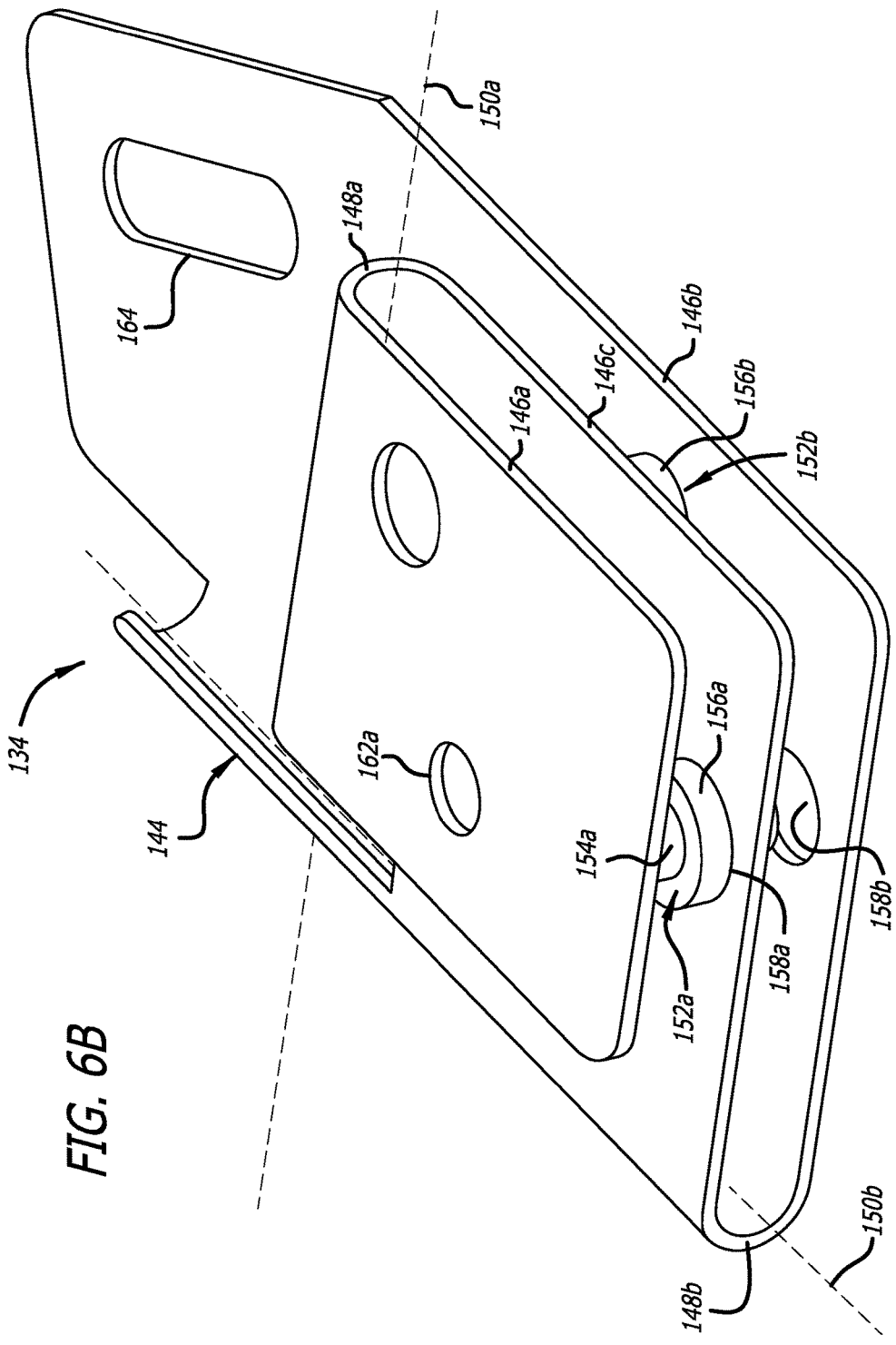

Referring to FIGS. 6a and 6b, one embodiment of the dual-axis tilt platform 134 will now be described. The dual-axis tilt platform 134 comprises a monolithic spring structure 144 (i.e., formed from a single continuous and uninterrupted piece of material) composed of a suitable resilient material, such as spring steel. The resilient material from which the spring structure 144 is composed is preferably non-magnetic, so as not to cause interference with the electronics in the display modules 136 and head tracking detector 120 (shown in FIG. 5). The spring structure 144 includes a first outer planar structure 146a, a second outer planar structure 146b, a middle planar structure 146c disposed between the first and second outer planar structures 146a, 146b, a first hinge structure 148a coupling the first outer planar structure 146a and the middle planar structure 146c to each other, and a second hinge structure 148b coupling the second outer planar structure 146b and the middle planar structure 146c to each other. As shown in FIGS. 6a and 6b, the first and second hinge structures 148a, 148b respectively have first and second hinge axes 150a, 150b that are orthogonal to each other. Significantly, unlike the conventional dual-axis tilt platforms, which have two separate mounting plates connected by a ball or pedestal, and a captive spring arrangement of some kind for each axis of adjustment to hold the mounting plates in mechanical relationship which is relatively large, heavy, and complex, the monolithic spring structure 144 achieves a light-weight, compact, and simple design by combining the springs and plates for both axes into the same fundamental spring structure.

The dual-axis tilt platform 134 further comprises a first tilt angle adjustment mechanism 152a configured for tilting the first outer planar structure 146a and the middle planar structure 146c relative to each other about the first hinge axis 150a, and a second tilt angle adjustment mechanism 152b configured for tilting the second outer planar structure 146b and the middle planar structure 146c relative to each other about the second hinge axis 150b. In the illustrated embodiment, the first tilt angle adjustment mechanism 152a includes a first set screw 154a configured for being rotated to tilt the first outer planar structure 146a and the middle planar structure 146c relative to each other about the first hinge axis 150a, and second adjustment mechanism 152b includes a second set screw 154b configured for being rotated to tilt the second outer planar structure 146b and the middle planar structure 146c relative to each other about the second hinge axis 150b. To this end, the first set screw 154a is disposed between the first outer planar structure 146a and the middle planar structure 146c, and the second set screw 154b is disposed between the second outer planar structure 146b and the middle planar structure 146c.

To retain the set screws 154a, 154b, the first tilt angle adjustment mechanism 152a further includes a first clinch nut 156a in which the first set screw 154a is threadingly engaged, and the second tilt angle adjustment mechanism 152b further includes a second clinch nut 156b in which the second set screw 154b is threadingly engaged. The first clinch nut 156a is affixed to one of the first outer planar structure 146a and the middle planar structure 146c.

In the illustrated embodiment, the first clinch nut 156a is affixed to the middle planar structure 146c, such that the end of the first set screw 154a bears against the inner surface of the first outer planar structure 146a. As a result, rotation of the first set screw 154a in one direction linearly advances it towards the first outer planar structure 146a, thereby increasing the tilt between the first outer planar structure 146a and the middle planar structure 146c about the first hinge axis 150a, whereas rotation of the first set screw 154a in the opposite direction linearly retracts it away from the first outer planar structure 146b, thereby decreasing the tilt between the first outer planar structure 146a and the middle planar structure 146c about the first hinge axis 150a. The first clinch nut 156a, and thus the corresponding first set screw 154a, are disposed in ideal locations near the ends of the first outer planar structure 146a and middle planar structure 146c opposite the first hinge structure 148a, thereby maximizing leverage in adjusting the tilt between the first outer planar structure 146a and the middle planar structure 146c about the first hinge axis 150a.

Similarly, the second clinch nut 156b is affixed to one of the second outer planar structure 146b and the middle planar structure 146c, such that the end of the second set screw 154b bears against the surface of the middle planar structure 146c. As a result, rotation of the second set screw 154b in one direction linearly advances it towards the middle planar structure 146c, thereby increasing the tilt between the second outer planar structure 146b and the middle planar structure 146c about the second hinge axis 150b, whereas rotation of the second set screw 154b in the opposite direction linearly retracts it away from the middle planar structure 146c, thereby decreasing the tilt between the second outer planar structure 146b and the middle planar structure 146c about the second hinge axis 150b. The second clinch nut 156b, and thus the corresponding second set screw 154b, are disposed near the ends of the second outer planar structure 146b and middle planar structure 146c opposite the second hinge structure 148b, thereby maximizing leverage in adjusting the tilt between the second outer planar structure 146b and the middle planar structure 146c about the second hinge axis 150b.

Each of the set screws 154a, 154b includes tool engagement element (not shown), e.g., a slot, cross, hex opening, etc., which allows a corresponding tool to selectively engage and rotate the first and second set screws 154a, 154b, thereby allowing convenient adjustment of the tilts between the respective planar structures 146a-146c. To provide access to the tool engagement element of the first set screw 154a from one side of the dual-axis tilt platform 134, the first clinch nut 156a is in communication with a hole 158a in the middle planar structure 146c through which the first set screw 154a extends, and the second outer planar structure 146b includes a hole 158b in axial alignment with the hole 158a and through which the tool can be inserted to engage the tool engagement element of the first set screw 154a. To provide access to the tool engagement element of the second set screw 154a from the same side of the dual-axis tilt platform 134, the second clinch nut 156b is in communication with a hole 160 in the second outer planar structure 146b through which the second set screw 154b extends.

The first outer planar structure 146a, second outer planar structure 146b, and middle planar structure 146c respectively have three axially aligned mounting holes 162a-162c through which a fastener (not shown) can be inserted and used to mount the dual-axis tilt platform 134 to the respective helmet mount 132. The second outer planar structure 54 further has a slotted mounting hole 164 in which the respective display module 136 is mounted via a fastener (not shown). The slotted mounting hole 164 allows the location of the display module 136 to be adjusted, so that the display screen 138 can be vertically aligned with the respective eye 128 of the trainee pilot 44 before affixing the display module 136 to the dual-axis tilt platform 134.

As can be appreciated from the foregoing, the first tilt angle adjustment mechanism 152a is configured for tilting the first outer planar structure 146a and the middle planar structure 146c relative to each other in a first angular range (e.g., −5 degrees to +5 degrees), and the second tilt angle adjustment mechanism 152b is configured for tilting the second outer planar structure 146b and the middle planar structure 146c relative to each other in a second angular range (e.g., −5 degrees to +5 degrees). Of course, the first and second angular ranges may be different from each other and may be any suitable range.

For example, with reference to FIGS. 7a and 7b, the dual-axis tilt platform 134 is in a completely closed state. That is, each of the first and second angular ranges is at a minimum (in this case, −5 degrees). As there shown, the first and second set screws 154a, 154b are in their fully retracted positions, so that the first outer planar structure 146a and the middle planar structure 146c are angled towards each other (in this case, −5 degrees) (best shown in FIG. 7a), and the second outer planar structure 146b and the middle planar structure 146c are angled towards each other (in this case, at a −5 degree angle) (best shown in FIG. 7b). In the illustrated embodiment, the spring structure 144 is completely in a relaxed state when each of the first and second angular ranges is at a minimum (in this case, at a −5 degree angle). As such, adjustment of the tilt between the first outer planar structure 146a and the middle planar structure 146c, and tilt the second outer planar structure 146b and the middle planar structure 146c, through the full angular range can be achieved via advancement of the respective set screws 154a, 154b towards the respective first outer planar structure 146a and the middle planar structure 146c.

With reference to FIGS. 8a and 8b, the dual-axis tilt platform 134 is in a half-way open state. That is, each of the first and second angular ranges is in the middle (in this case, 0 degrees). As there shown, the first and second set screws 154a, 154b are half-way advanced, so that the first outer planar structure 146a and the middle planar structure 146c are completely parallel to each other, i.e., neither tilted towards each other or away from each other (i.e., zero degrees) (best shown in FIG. 8a), and the second outer planar structure 146b and the middle planar structure 146c are completely parallel to each other, i.e., neither tilted towards each other or away from each other (i.e., zero degrees) (best shown in FIG. 8b).

With reference to FIGS. 9a and 9b, the dual-axis tilt platform 134 is in a completely open state. That is, each of the first and second angular ranges is at a maximum (in this case, +5 degrees). As there shown, the first and second set screws 154a, 154b are fully advanced, so that the first outer planar structure 146a and the middle planar structure 146c are fully tilted away from each other (in this case, at a +5 degree angle) (best shown in FIG. 9a), and the second outer planar structure 146b and the middle planar structure 146c are fully tilted away from each other (in this case, at a +5 degree angle) (best shown in FIG. 9b).

It should be appreciated that, although the both tilt angles of the dual-axis tilt platform 134 have been described as being identical for each of the three states in FIGS. 6-8 (i.e., either −5/−5 degrees, 0/0 degrees, or +5/+5 degrees), the tilt angles can differ from each other for any particular state of the dual-axis tilt platform 134. For example, for one particular state of the dual-axis tilt platform 134, the tilt angle between the first outer planar structure 146a and the middle planar structure 146c may be −5 degrees, and the second outer planar structure 146b and the middle planar structure 146c may be 0 degrees. Furthermore, although the tilt angles of the dual-axis tilt platform 134 have been illustrated in FIGS. 7-9 as being either −5 degrees, 0 degrees, or +5 degrees, it should be appreciated that the tilt angles can be any value in the range of −5 degrees and +5 degrees. Furthermore, although each of the first and second angular ranges has been described as having a minimum of −5 degrees and a maximum of +5 degrees, it should be appreciated that each of the first and second angular ranges may have different minimum and maximum values, such as −10 degrees and +10 degrees or −2 degrees and +2 degrees. Furthermore, although each of the first and second angular ranges is symmetrical, either or both of the first and second angular ranges may be asymmetrical, e.g., −2 degrees to +5 degrees.

Figure 10:
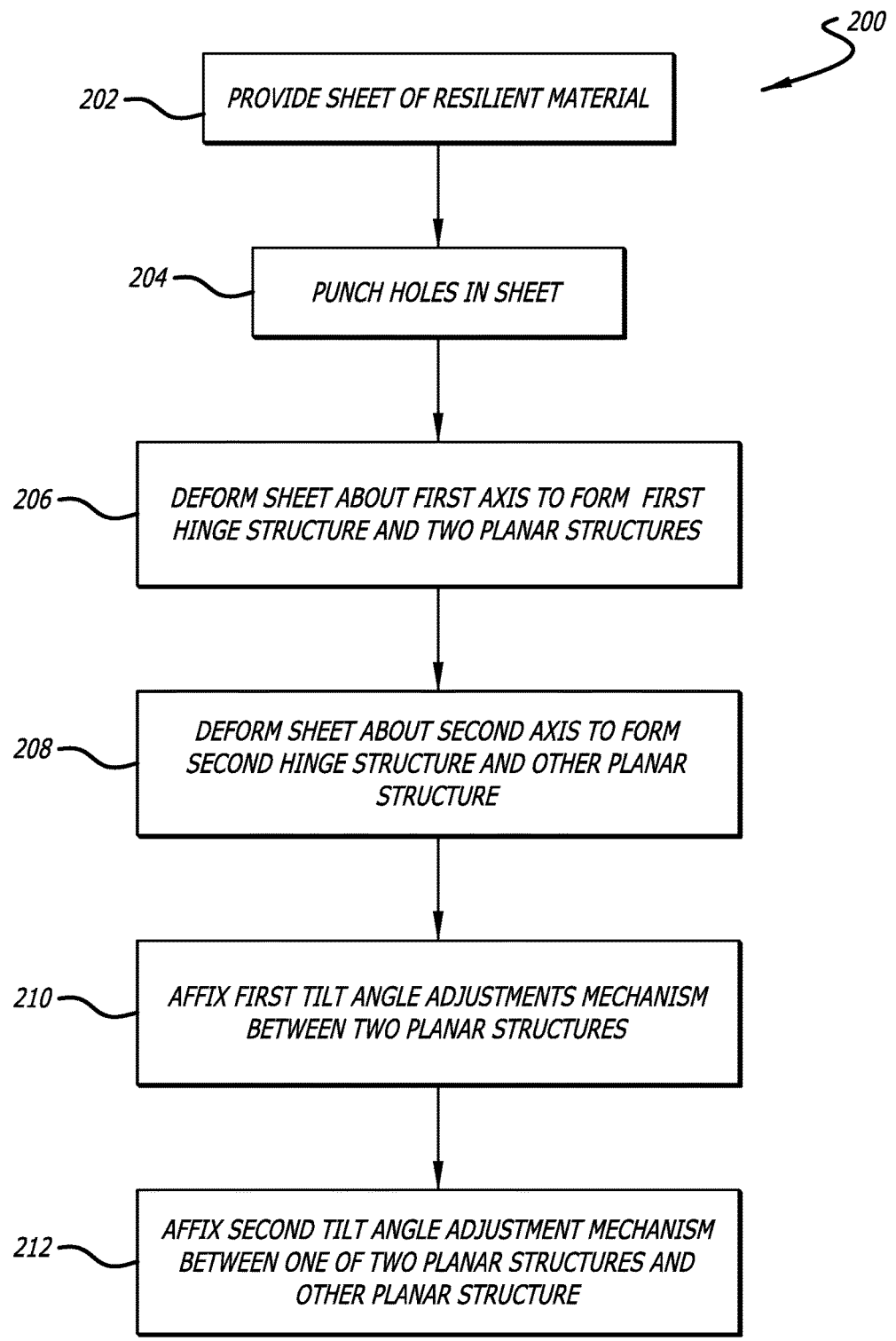
FIG. 10 is a flow diagram of one method of manufacturing the dual-axis tilt platform of FIGS. 6a and 6b.

Having described the structure, arrangement, and function of the dual-axis tilt platform 134, one method 200 of manufacturing the dual-axis tilt platform 134 will now be described with respect to FIG. 10. First, a sheet of resilient material (such as, spring steel) is provided (step 202). This sheet of resilient material will then be formed into the completed spring structure 144. In particular, holes are first formed (e.g., via punching) into the sheet of resilient material (step 204). The holes are strategically located in the sheet of resilient material, such that when the spring structure 144 is completed, the holes will make up the holes 158-164, with the holes 158a, 158b being axially aligned with each other, and the holes 162a-162c being axially aligned with each other.

Next, the sheet of resilient material is plastically deformed about a first axis to form two planar structures and a first hinge structure disposed between the two planar structures (step 206), and then, one of the two planar structures is plastically deformed about a second axis orthogonal to the first axis to form another planar structure and a second hinge structure between the one of the two planar structures and the other planar structure (step 208). At this point, the spring structure 144 is completed, with the two planar structures forming the first outer planar structure 146a (or alternatively, the second outer planar structure 146b) and the middle planar structure 146c; the other planar structure forming the second outer planar structure 146b (or alternatively, the first outer planar structure 146a), the first and second hinge structures forming the first and second hinge structures 148a, 148b (or vice versa); and the first and second axes coinciding with the first and second hinge axes 150a, 150b (or vice versa), as illustrated in FIGS. 6a and 6b.

Next, the first tilt angle adjustment mechanism 152a is affixed between the two planar structures (the first outer planar structure 146a and the middle planar structure 146c) (step 210), and the second tilt angle adjustment mechanism 152b is affixed between the one of the two planar structures (the middle planar structure 146c) and the other planar structure (the second outer planar structure 146b) (step 212). In one example, this can be accomplished by affixing the first clinch nut 156a to the portion of the sheet of resilient material that will form (i.e., prior to bending the sheet of resilient material) or that forms (i.e., after bending the sheet of resilient material) one of the two planar structures (the first outer planar structure 146a or the middle planar structure 146c); and affixing the second clinch nut 156b to the portion of the sheet of resilient material that will form (i.e., prior to bending the sheet of resilient material) or that forms (i.e., after bending the sheet of resilient material) one of another of the two planar structures and the other planar structure (the middle planar structure 146c or the second outer planar structure 146b). The first and second clinch nuts 156a, 156b can be affixed to the sheet of resilient material, e.g., by respectively press fitting them into the openings 158a and 160. The first and second set screws 154a, 154b may then be threaded through the first and second clinch nuts 156a, 156b.

Figure 11:
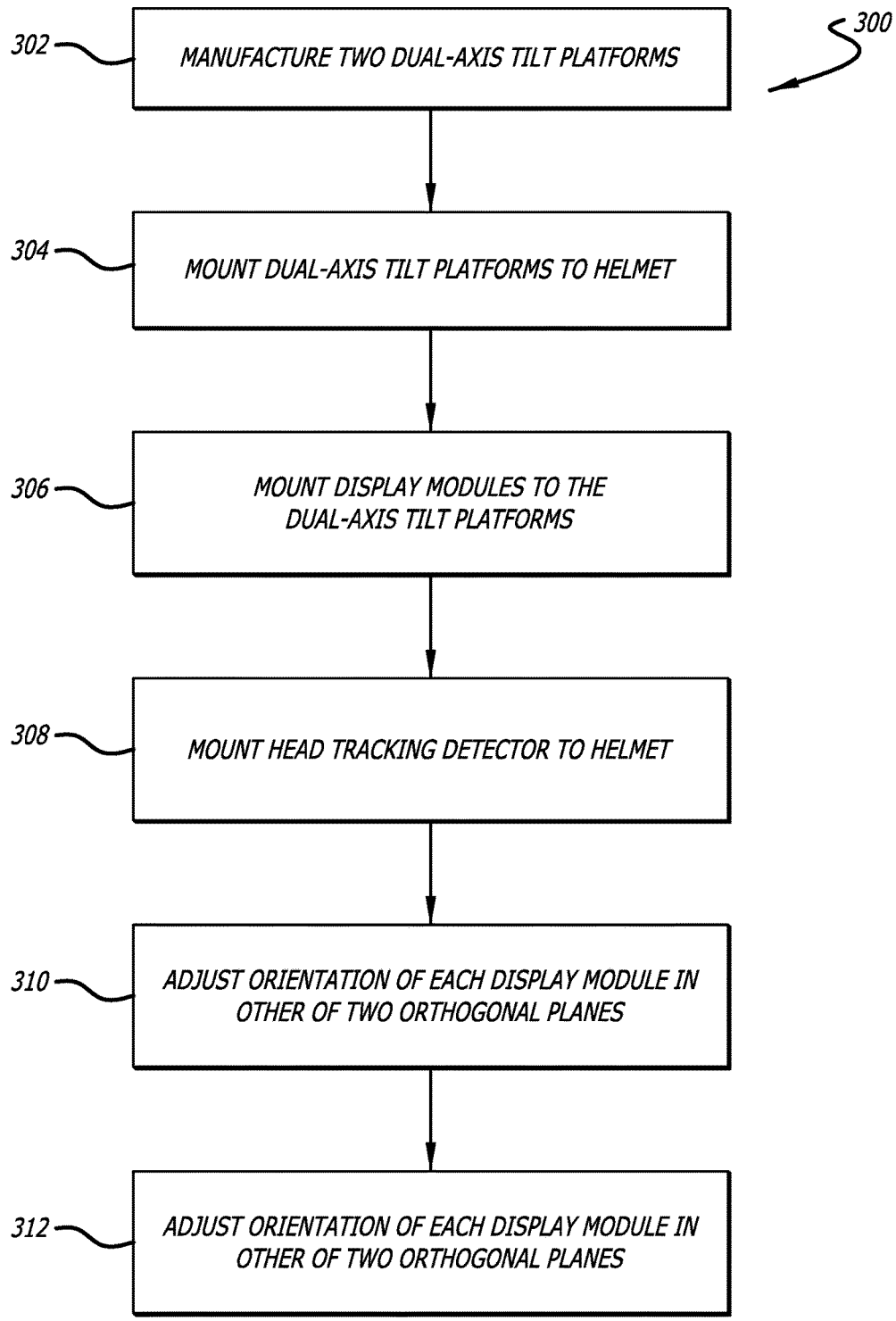
FIG. 11 is a flow diagram of one method of manufacturing the HMD of FIG. 5.

Referring now to FIG. 11, one method 300 of manufacturing the HMD 102 will be described. First, at least one (in this case, two) of the dual-axis tilt platforms 44 are manufactured in accordance with the method 100 illustrated in FIG. 9 (step 302). Next, the two dual-axis tilt platforms 44 are mounted to the head gear (in this case, the helmet 124 via the left and right helmet mounts 132a, 132b) (e.g., using fasteners inserted through the mounting holes 162a-162c) (step 304). Then, at least one (in this case, two) display modules 136 are respectively mounted to the dual-axis tilt platforms 44 (e.g., using fasteners inserted through the slotted mounting holes 164) (step 306). This can be accomplished prior to or after the dual-axis tilt platforms 44 to the helmet 124. The vertical disposition of the display modules 136 may be adjusted prior to affixation by moving the fasteners up or down within the slotted mounting holes 164). Next, the head tracking detector 120 is mounted to the helmet 124 via the middle helmet mount 132c (step 308).

Then, the orientation of each of the display modules 136 is adjusted in one of the two orthogonal planes by selectively tilting the first outer planar structure 146a and the middle planar structure 146c of the respective dual-axis tilt platform 134 relative to each other about the first hinge axis 150a of the first hinge structure 148a (step 310). Adjustment of the orientation of each display module 136 in the one orthogonal plane is accomplished via manipulation of the respective first tilt angle adjustment mechanisms 152a, and in particular, rotation of the first set screws 154a via the appropriate tool. Preferably, the orientations of the display modules 136 are adjusted in the one orthogonal plane until a vergence condition is achieved in a first dimension (i.e., the optical axes of the display modules 136 converge in one dimension of the focal plane of the OTW screen 114).

The orientation of each of the display modules 136 is then adjusted in another one of the two orthogonal planes by selectively tilting the second outer planar structure 146b and the middle planar structure 146c of the respective dual-axis tilt platform 134 relative to each other about the second hinge axis 150b of the first hinge structure 148b (step 312). Adjustment of the orientation of each display module 136 in the other orthogonal plane is accomplished via manipulation of the second tilt angle adjustment mechanisms 152b, and in particular, rotation of the second set screws 154b via the appropriate tool. Preferably, the orientations of the display modules 136 are adjusted in the other orthogonal plane until a vergence condition is achieved in a second dimension (i.e., the optical axes of the display modules 136 converge in the other dimension of the focal plane of the OTW screen 114).

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A dual-axis tilt platform for use in a head mounted display (HMD), the tilt platform, comprising:
    a monolithic spring structure including a first outer planar structure, a second outer planar structure, a middle planar structure disposed between the first and second outer planar structures, a first hinge structure coupling the first outer planar structure and the middle planar structure to each other, and a second hinge structure coupling the second outer planar structure and the middle planar structure to each other, the first and second hinge structures having respective first and second hinge axes that are orthogonal to each other; and
    a first adjustment mechanism configured for tilting the first outer planar structure and the middle planar structure relative to each other about the first hinge axis; and
    a second adjustment mechanism configured for tilting the second outer planar structure and the middle planar structure relative to each other about the second hinge axis.

2. The dual-axis tilt platform of claim 1, wherein the monolithic spring structure is composed of spring steel.

3. The dual-axis tilt platform of claim 1,
    wherein the first adjustment mechanism includes a first set screw configured for being rotated to tilt the first outer planar structure and the middle planar structure relative to each other about the first hinge axis; and
    wherein the second adjustment mechanism includes a second set screw configured for being rotated to tilt the second outer planar structure and the middle planar structure relative to each other about the second hinge axis.

4. The dual-axis tilt platform of claim 1,
    wherein the first adjustment mechanism further includes a first clinch nut in which a first set screw is threadingly engaged, the first clinch nut being affixed to one of the first outer planar structure and the middle planar structure; and wherein the second adjustment mechanism further includes a second clinch nut in which a second set screw is threadingly engaged, the second clinch nut being affixed to one of the second outer planar structure and the middle planar structure.

5. The dual-axis tilt platform of claim 1,
wherein the first adjustment mechanism is configured for selectively tilting the first outer planar structure and the middle planar structure relative to each other in a first angular range; and
wherein the second adjustment mechanism is configured for selectively tilting the second outer planar structure and the middle planar structure relative to each other in a second angular range.

6. The dual-axis tilt platform of claim 5, wherein each of the first and second angular ranges is a range of −5 degrees to +5 degrees.

7. The dual-axis tilt platform of claim 5, wherein each of the first and second angular ranges is at a minimum when the monolithic spring structure is in a relaxed state.

8. A head mounted display (HMD), comprising:
head gear configured for being worn on the head of a user;
at least one dual-axis tilt platform mounted to the head gear, each of the at least one dual-axis tilt platform comprising a monolithic spring structure including a first outer planar structure, a second outer planar structure, a middle planar structure disposed between the first and second outer planar structures, a first hinge structure having a first hinge axis about which the first outer planar structure and the middle planar structure can be selectively tilted relative to each other, and a second hinge structure having a second hinge axis about which the second outer planar structure and the middle planar structure can be selectively tilted relative to each other, the first and second hinge axes being orthogonal to each other; and
at least one display module respectively mounted to the at least one dual-axis tilt platform, such that an orientation of each of the at least one display module is adjustable in two orthogonal planes.

9. The HMD of claim 8, further comprising a head tracking detector mounted to the head gear, the head tracking detector configured for tracking a position and/or direction of the head of the user.

10. The HMD of claim 8, wherein the head gear comprises a helmet.

11. The HMD of claim 8, wherein each of the at least one display module includes a display screen and an image projection device mechanically coupled to each other, the display screen locatable in front of a respective eye of the user, and the image projection device configured for projecting an image via the display screen.

12. The HMD of claim 11, wherein the display screen is a semi-reflective mirror.

13. The HMD of claim 8, wherein the at least one dual-axis tilt platform comprises two dual-axis tilt platforms, and the at least one display module comprises two display modules respectively mounted to the two dual-axis tilt platforms.

14. A method of using the HMD of claim 8, comprising:
adjusting the orientation of each of the at least one display module in one of the two orthogonal planes by selectively tilting the first outer planar structure and the middle planar structure relative to each other about the first hinge axis of the first hinge structure; and
adjusting the orientation of each of the at least one display module in another of the two orthogonal planes by selectively tilting the second outer planar structure and the middle planar structure relative to each other about the second hinge axis of the second hinge structure.

15. A method of using the HMD of claim 11, wherein the at least one display module comprises two display modules, and wherein:
adjusting the orientation of each of the two display modules in one of the two orthogonal planes comprises selectively tilting the first outer planar structure and the middle planar structure relative to each other about the first hinge axis of the first hinge structure for each of the display modules until optical axes of the display modules converge in one dimension of a focal plane; and
adjusting the orientation of each of the two display modules in another of the two orthogonal planes comprises selectively tilting the second outer planar structure and the middle planar structure relative to each other about the second hinge axis of the second hinge structure for each of the display modules until the optical axes of the display modules converge in another dimension of the focal plane.

16. A method of manufacturing a dual-axis tilt platform for use in a head mounted display (HMD), the method comprising:
providing a sheet of resilient material;
plastically deforming the sheet of resilient material about a first axis to form two planar structures and a first hinge structure disposed between the two planar structures;
plastically deforming one of the two planar structures about a second axis orthogonal to the first axis to form another planar structure and a second hinge structure between the one of the two planar structures and the another planar structure;
affixing a first tilt angle adjustment mechanism between the two planar structures; and
affixing a second tilt angle adjustment mechanism between the one of the two planar structures and the another planar structure.

17. The method of claim 16, wherein the sheet of resilient material comprises spring steel.

18. The method of claim 16,
wherein affixing the first tilt angle adjustment mechanism between the two planar structures comprises press fitting a first clinch nut to the portion of the sheet of resilient material that will form or that forms one of the two planar structures, and threading a first set screw through the first clinch nut to dispose the first set screw between the two planar structures; and
wherein affixing the second tilt angle adjustment mechanism between the one of the two planar structures and the another planar structure comprises press fitting a second clinch nut to the portion of the sheet of resilient material that will form or that forms one of another of the two planar structures and the another planar structure, and threading a second set screw through the second clinch nut to dispose the second set screw between the one of the two planar structures and the another planar structure.

19. A method of manufacturing a head mounted display (HMD), comprising:
manufacturing at least one dual-axis tilt platform in accordance with claim 16;

mounting the at least one dual-axis tilt platform to head gear; and mounting at least one display module respectively to the at least one dual-axis tilt platform.

20. The method of claim 19, further comprising mounting a head tracking detector to the head gear.

21. The method of claim 19, wherein the head gear comprises a helmet.

22. The method of claim 19, wherein the at least one dual-axis tilt platform comprises two dual-axis tilt platforms, and the at least one display module comprises two dual-axis display modules.

* * * * *